(12) United States Patent
Horii et al.

(10) Patent No.: US 6,643,335 B1
(45) Date of Patent: Nov. 4, 2003

(54) SIGNAL POINT ARRANGEMENT DISPERSION CALCULATION CIRCUIT

(75) Inventors: Akihiro Horii, Zama (JP); Kenichi Shiraishi, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/463,222
(22) PCT Filed: May 20, 1998
(86) PCT No.: PCT/JP98/02204
§ 371 (c)(1),
(2), (4) Date: Jan. 21, 2000
(87) PCT Pub. No.: WO99/05834
PCT Pub. Date: Feb. 4, 1999

(30) Foreign Application Priority Data

Jul. 24, 1997 (JP) ............................................. 9-212745

(51) Int. Cl.[7] .............................................. H04L 27/22
(52) U.S. Cl. ........................................ 375/329; 375/234
(58) Field of Search ................................ 375/329, 234, 375/355; 370/206

(56) References Cited

U.S. PATENT DOCUMENTS 5,970,093 A * 10/1999 de Lantremange .......... 375/234

* cited by examiner

Primary Examiner—Stephen Chin
Assistant Examiner—Curtis Odom
(74) Attorney, Agent, or Firm—Eric J. Robinson; Robinson Intellectual Property Law Office, P.C.

(57) ABSTRACT

A signal point arrangement dispersion calculation circuit whose circuit scale is small. The phase of a demodulation baseband signal is turned by a 22.5° turning remapper (3) at a speed twice the speed of the symbol rate of the demodulation baseband signal. The signal point position of the demodulation baseband signal is found by a signal point arrangement conversion circuit (73) in accordance with the demodulation baseband signal and the baseband signal whose phase is turned by a phase turning circuit. The signal point arrangement of the demodulation baseband signal is converted into the position of the first quadrant in accordance with the found signal point position from the demodulation baseband signal and the baseband signal whose phase is turned 45° by the two successive rotations made by the 22.5° turning remapper (3), and the dispersion is obtained in accordance with the baseband signal whose signal point arrangement is converted.

2 Claims, 6 Drawing Sheets

| AREA | JUDGEMENT |
|------|-----------|
| (a) | SIGN OF Ii IS INVERTED RELATIVE TO SIGN OF I AND Q IS POSITIVE |
| (b) | SIGN OF Iq IS INVERTED RELATIVE TO SIGN OF Q AND I IS POSITIVE |
| (c) | SIGN OF Ii IS INVERTED RELATIVE TO SIGN OF I AND Q IS NEGATIVE |
| (d) | SIGN OF Iq IS INVERTED RELATIVE TO SIGN OF Q AND I IS NEGATIVE |
| (e) | SIGNS OF Iq AND Q REMAIN POSITIVE AND Ii>Iq |
| (f) | SIGNS OF Ii AND I REMAIN POSITIVE AND Ii<|Iq| |
| (g) | SIGNS OF Iq AND Q REMAIN NEGATIVE AND Ii<Iq |
| (h) | SIGNS OF Ii AND I REMAIN NEGATIVE AND |Ii|<Iq |
| 1 | SIGNS OF I AND Q ARE POSITIVE AND SIGNAL POINT IS NOT IN AREAS (a) AND (e) |
| 3 | SIGN OF I IS POSITIVE, SIGN OF Q IS NEGATIVE AND SIGNAL POINT IS NOT IN AREAS (b) AND (f) |
| 5 | SIGNS OF I AND Q ARE NEGATIVE AND SIGNAL POINT IS NOT IN AREAS (c) AND (g) |
| 7 | SIGN OF I IS NEGATIVE, SIGN OF Q IS POSITIVE AND SIGNAL POINT IS NOT IN AREAS (d) AND (h) |

FIG. 6

| AREA | CONVERSION CONTENTS (HI, HQ) |
|---|---|
| (a) | CONVERT INTO ABSOLUTE VALUE OF i AXIS, i AXIS→q AXIS, q AXIS→i AXIS |
| (b) | i AXIS, q AXIS |
| (c) | CONVERT INTO ABSOLUTE VALUE OF q AXIS, i AXIS→q AXIS, q AXIS→i AXIS |
| (d) | CONVERT INTO ABSOLUTE VALUES OF i AND q AXES |
| (e) | i AXIS, q AXIS |
| (f) | CONVERT INTO ABSOLUTE VALUE OF q AXIS, i AXIS→q AXIS, q AXIS→i AXIS |
| (g) | CONVERT INTO ABSOLUTE VALUES OF i AND q AXES |
| (h) | CONVERT INTO ABSOLUTE VALUE OF i AXIS, i AXIS→q AXIS, q AXIS→i AXIS |
| 1 | I AXIS, Q AXIS |
| 3 | CONVERT INTO ABSOLUTE VALUE OF Q AXIS, I AXIS→Q AXIS, Q AXIS→I AXIS |
| 5 | CONVERT INTO ABSOLUTE VALUES OF I AND Q AXES |
| 7 | CONVERT INTO ABSOLUTE VALUE OF I AXIS, I AXIS→Q AXIS, Q AXIS→I AXIS |

SIGNAL POINT ARRANGEMENT DISPERSION CALCULATION CIRCUIT

BACKGROUND OF THE INVENTION

1. Field of the Invention

The present invention relates to a signal point arrangement dispersion value calculation circuit for calculating a signal point arrangement dispersion value of a baseband signal demodulated from a received phase shift keying signal, and more particularly to a signal point arrangement dispersion value calculation circuit used with a carrier reproduction circuit for reproducing a carrier from a demodulated baseband signal or an absolute phasing circuit for making the phase angle of a baseband signal demodulated from a reception signal point arrangement coincide with a transmission signal phase angle.

2. Description of Related Art

A broadcasting receiver for receiving digitally modulated radio waves such as 8PSK modulated waves, QPSK modulated waves and BPSK modulated waves controls the frequency of a reproduction carrier wave in accordance with a signal point dispersion value of a baseband signal. This technique is disclosed, for example, in Japanese Patent Application No. 9-163530. A phase rotation angle of a current reception signal is obtained from the signal point arrangement of a demodulated baseband signal, and in accordance with the obtained reception signal phase rotation angle, the phase of the demodulated baseband signal is rotated reversely to execute absolute phasing, i.e, to make the demodulation baseband signal coincide with the transmission signal phase angle.

In the case of QPSK modulation, the demodulated baseband signals (I, Q) have reference positions (0, 0), (0, 1), (1, 1) and (1, 0) in which (0, 0) is set in the first quadrant, (0, 1) is set in the second quadrant, (1, 1) is set in the third quadrant and (1, 0) is set in the fourth quadrant, and (0, 1) is rotated by 90° in the clockwise direction, (1, 1) is rotated by 180° in the clockwise direction and (1, 0) is rotated by 90° in the counter-clockwise direction to set all reference positions in the first quadrant. The demodulated baseband signals (I, Q) set in the first quadrant are supplied to a signal point arrangement conversion circuit to convert the signals into signal point arrangement conversion data.

Dispersion values are calculated from the signal point arrangement conversion data converted by the signal point arrangement conversion circuit, and compared with a predetermined reference value A to count the occurrence frequency of dispersion values equal to or larger than the reference value A during a predetermined unit period. A total sum DSMS of occurrence frequencies of dispersion values equal to or larger than the reference value A during the predetermined unit period is calculated. In accordance with this total sum DSMS, a C/N is judged and in accordance with the judged C/N, the frequency of a reproduction carrier is controlled.

According to the above-described conventional technique, the signal point arrangement conversion circuit operates to set the baseband signals: (I, Q) to the first quadrant. In the case of QPSK modulation, setting the baseband signals to the first quadrant is realized by exchanging the I axis or Q axis in each quadrant. In the case of multi-value modulation such as 8 PSK modulation, baseband signals are set to the first quadrant by using a conversion table stored in a ROM.

If the signal point arrangement conversion is performed by using a conversion table stored in ROM, the size of the conversion table stored in ROM becomes too large to be implemented in an integrated circuit.

It is an object of the invention to provide a signal point arrangement dispersion value calculation circuit having a small circuit scale.

SUMMARY OF THE INVENTION

A signal point arrangement dispersion calculation circuit of this invention, comprises: a phase rotation circuit for rotating a phase of a demodulated baseband signal; a signal point arrangement conversion circuit for judging a signal point arrangement of the demodulated baseband signal in accordance with the demodulated baseband signal and a baseband signal whose phase is rotated by the phase rotation circuit, and in accordance with the judged signal point arrangement, converting the signal point arrangement of the demodulated baseband signal into a predetermined quadrant by using the demodulated baseband signal and the baseband signal whose phase is rotated by the phase rotation circuit; and dispersion value calculating means for calculating a dispersion value in accordance with the baseband signal whose signal point arrangement is converted.

A signal point arrangement dispersion calculation circuit of this invention, comprises: a phase rotation circuit for rotating a phase of a demodulated baseband signal by 22.5° at a speed twice as fast as a symbol rate of the demodulated baseband signal; a signal point arrangement conversion circuit for judging a signal point arrangement of the demodulated baseband signal in accordance with the demodulated baseband signal and a baseband signal whose phase is rotated by the phase rotation circuit, and in accordance with the judged signal point arrangement, converting the signal point arrangement of the demodulated baseband signal into a predetermined quadrant by using the demodulated baseband signal and the baseband signal whose phase is rotated by 45° through consecutive two rotations by the phase rotation circuit; and dispersion value calculating means for calculating a dispersion value in accordance with the baseband signal whose signal point arrangement is converted.

According to the signal point dispersion calculation circuit of this invention, the phase rotation circuit rotates rotating the phase of a demodulated baseband signal by 22.5° at a speed twice as fast as a symbol rate of the demodulated baseband signal. The signal point arrangement conversion circuit judges a signal point arrangement of the demodulated baseband signal in accordance with the demodulated baseband signal and a baseband signal whose phase is rotated by the phase rotation circuit, and in accordance with the judged signal point arrangement, converts the signal point arrangement of the demodulated baseband signal into a predetermined quadrant by using the demodulated baseband signal and the baseband signal whose phase is rotated by 45° through consecutive two rotations by the phase rotation circuit; and the dispersion value calculating means calculates a dispersion value in accordance with the baseband signal: whose signal point arrangement is converted.

The signal point arrangement of the demodulated baseband signal is judged in accordance with the demodulated baseband signal and a baseband signal whose phase is rotated by 22.5° by the phase rotation circuit, and in accordance with the judged signal point arrangement, the signal point arrangement of the demodulated baseband signal is converted by using the demodulated baseband signal and the baseband signal whose phase is rotated by 45 through consecutive two rotations by the phase rotation circuit. Accordingly, a conventional conversion table stored in ROM for signal point arrangement conversion is not necessary, and the signal point arrangement conversion circuit can be realized by logic circuits to thus reduce the circuit scale.

DETAILED DESCRIPTION OF THE INVENTIONS

Figure 1:
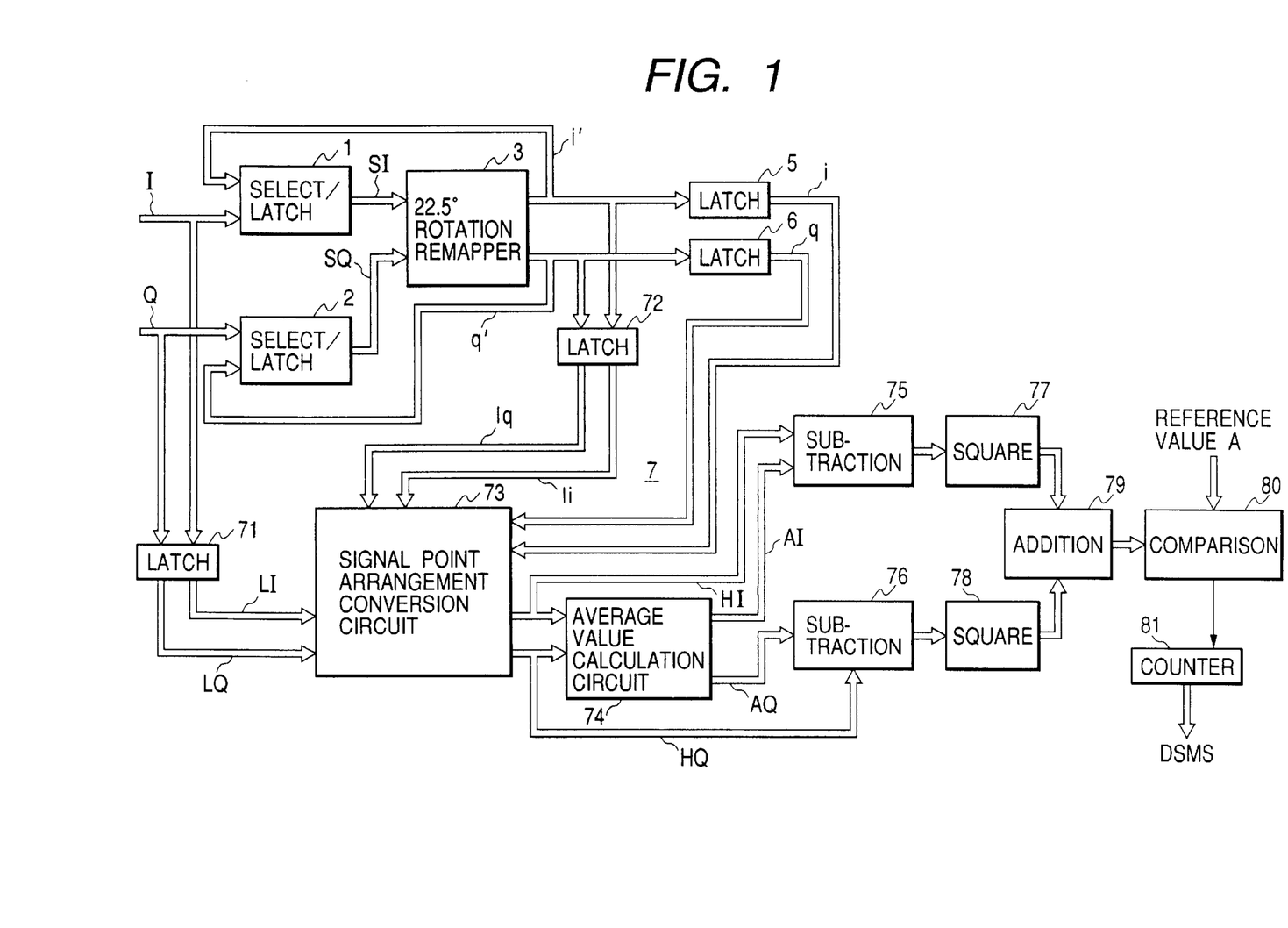
FIG. 1 is a block diagram showing the structure of a signal point arrangement dispersion value calculation circuit according to an embodiment of the invention.

A signal point arrangement dispersion value calculation circuit according to an embodiment of the invention will be described. FIG. 1 is a block diagram showing the structure of the signal point arrangement dispersion value calculation circuit of the embodiment.

Baseband signals (I, Q) demodulated by an unrepresented demodulation circuit are supplied to select/latch circuits 1 and 2. Latch outputs (SI, SQ) of the select/latch circuits 1 and 2 are supplied to a 22.5° turning remapper 3 to rotate the coordinate system by 22.50° in the counter-clockwise direction. Baseband output signals (i', q') of the 22.5° turning remapper 3 are supplied to the select/latch circuits 1 and 2. The select/latch circuits 1 and 2 alternately latch the input baseband signals (I, Q) and (i', q') at a half period of a symbol rate period synchronizing with the symbol rate. The 22.5° turning remapper 3 rotates the coordinate system twice in the counter-clockwise direction during one symbol rate period to thereby rotate the coordinate system by 22.5°×2= 45°.

The coordinate system rotation by the 22.5° turning remapper 3 is equivalent to the phase rotation of the baseband signals (SI, SQ) by 22.5° in the clockwise direction. Therefore, the output baseband signals (i', q') of the 22.5° turning remapper 3 are given by:

$$i'=SI\cos(22.5°)-SQ\sin(22.5°)$$

$$q'=SQ\cos(22.5°)+SI\sin(22.5°)$$

The 22.5° turning remapper 3 can therefore be structured by coefficient multiplication circuits and addition/subtraction circuits.

The output baseband signals (i', q') of the 22.5° turning remapper 3 are supplied to latch circuits 5 and 6 which latch them at the symbol rate period. Therefore, the latch circuits 5 and 6 output baseband signals (i, q) subjected to coordinate system conversion by 45°.

The demodulated baseband signals (I, Q), baseband signals (i', q') output from the 22.5° turning remapper 3 and baseband signals (i, q) output from the latch circuits 5 and 6 are supplied to a signal point arrangement conversion—dispersion value calculation circuit 7 which executes a signal point arrangement conversion operation and a dispersion value calculation operation.

The signal point arrangement conversion—dispersion value calculation circuit 7 includes a signal point arrangement conversion circuit 73 and an average value calculation circuit 74. The signal point arrangement conversion circuit 73 receives: baseband signals (LI, LQ) output from a latch circuit 71 which latches the baseband signals (I, Q) at the symbol rate period; baseband signals (li, lq) output from a latch circuit 72 which latches the baseband signals (i', q') output from the 22.5° turning remapper 3 at a half period of the symbol rate period synchronizing the symbol rate; and baseband signals (i, q) output from the latch circuit 5 and 6, and converts the signal point arrangement of the demodulated baseband signals (I, Q) into the first quadrant. The average value calculation circuit 74 calculates an average value of the baseband signals (HI, HQ) converted into the first quadrant by the signal point arrangement conversion circuit 73. Therefore, the demodulated baseband signals (I, Q) are converted to the first quadrant by the signal point arrangement conversion circuit 73, and in accordance with the baseband signals (HI, HQ) output from the signal point arrangement conversion circuit 73, the average value calculation circuit 74 calculates the average value. The average value calculation circuit 74 outputs baseband signals (AI, AQ).

The signal point arrangement conversion—dispersion value calculation circuit 7 further includes: a subtraction circuit 75 for subtracting the baseband signal (AI) from the baseband signal (HI); a square circuit 77 for squaring the baseband signal output from the subtraction circuit 75; a subtraction circuit 76 for subtracting the baseband signal (AQ) from the baseband signal (HQ); a square circuit 78 for squaring the baseband signal output from the subtraction circuit 76; an adder circuit 79 for adding an output (ISQ) from the square circuit 77 and an output (QSQ) from the square circuit 78 together; a comparison circuit 80 for comparing an output (ADIQ) from the adder circuit 79 with a reference value A; and a counter 81 for counting outputs from the comparison circuit 80.

Figure 2A:
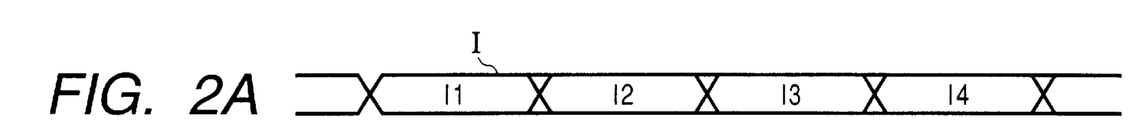
FIGS. 2A to 2G are timing charts illustrating the operation of the signal point arrangement dispersion value calculation circuit of the embodiment.
Figure 2B:
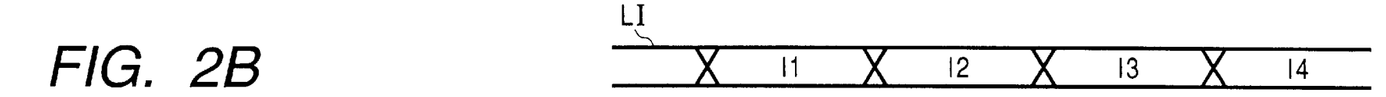
Figure 2C:
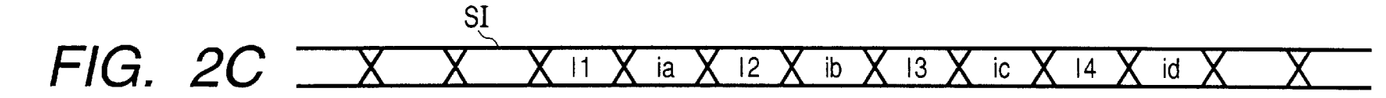
Figure 2D:
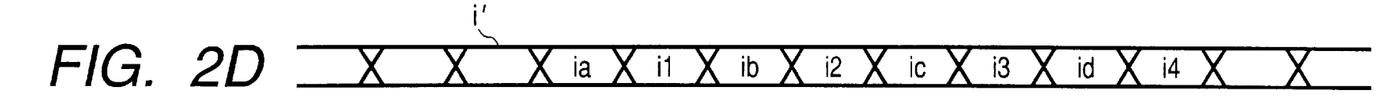
Figure 2E:
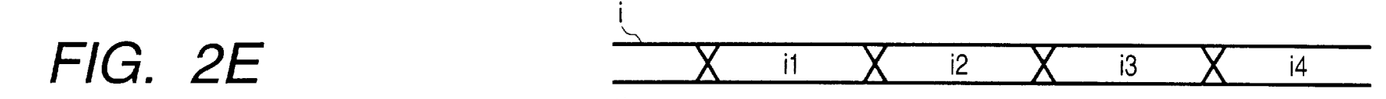
Figure 2F:
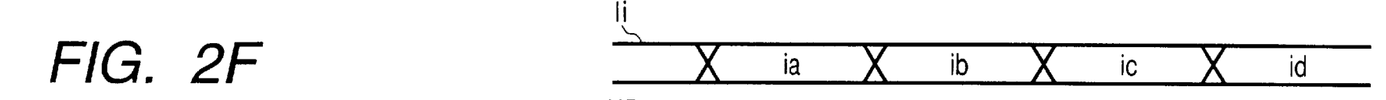
Figure 2G:
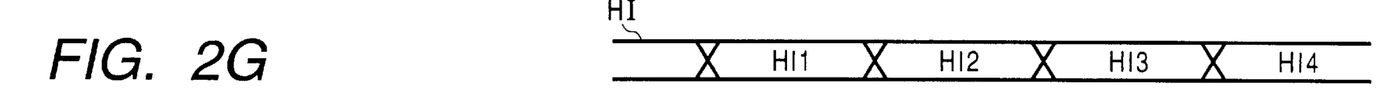

The output timings of baseband signals only on the I axis side are shown in FIGS. 2A to 2G, these baseband signals including: the baseband signal (I); baseband signal (LI) output from the latch circuit 71; baseband signal (SI) output from the select/latch circuit 1; baseband signal (i') output from the 22.5° turning remapper 3; baseband signal (i) output from the latch circuit 5; baseband signal (li) output from the latch circuit 72; and baseband signal (HI) output from the signal point arrangement conversion circuit 73. The occurrence period of the baseband signal (I) corresponds to the baseband rate. Symbols ia, ib, ic, . . . shown in FIGS. 2C and 2D schematically show the outputs from the 22.5° turning remapper 3.

The signal point arrangement conversion by the signal point arrangement conversion circuit 73 will be later described. Dispersion values of the baseband signals (HI, HQ) whose signal point arrangement was converted by the signal point arrangement conversion circuit 73 are calculated by the average value calculation circuit 74, subtraction circuits 75 and 76, square circuits 77 and 78 and addition circuit 79. Dispersion values equal to or larger than the reference value A are detected by the comparison circuit 8, and a counter 81 counts the occurrence frequency of dispersion values equal to or larger than the reference value A during a predetermined unit period, to thereby obtain the total sum DSMS of occurrence frequencies of dispersion values equal to or larger than the reference value A during the unit period.

Next, the signal point arrangement conversion by the signal point arrangement conversion circuit 73 will be described by taking 8PSK modulation as an example.

Figure 3:
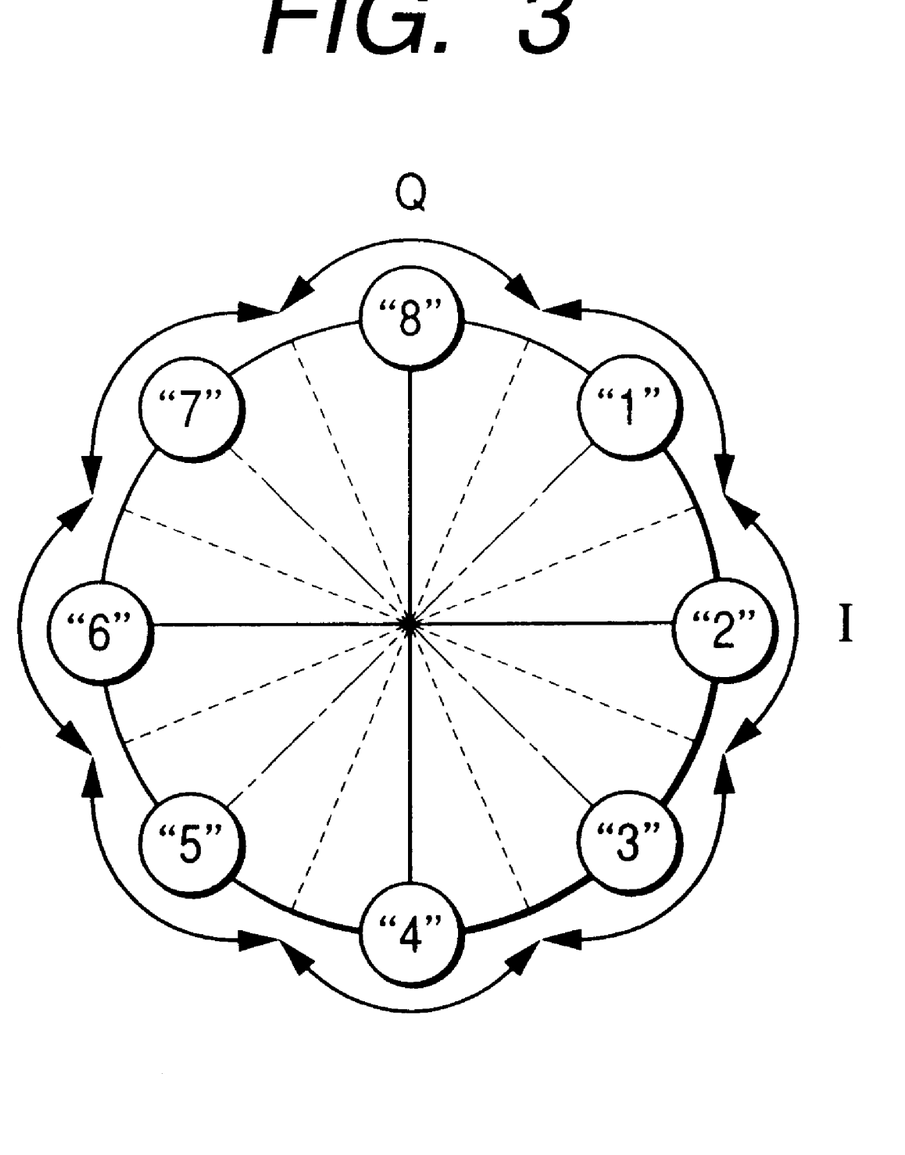
FIG. 3 is a schematic diagram illustrating an operation of judging a signal point arrangement to be executed by the signal point arrangement dispersion value calculation circuit of the embodiment.

In the case of 8PSK modulation, signal point arrangements corresponding to ranges "1" to "8" schematically shown by arrows in FIG. 3 are converted into the first quadrant. The signal point arrangement of each input baseband signal is unknown.

Figure 4A:
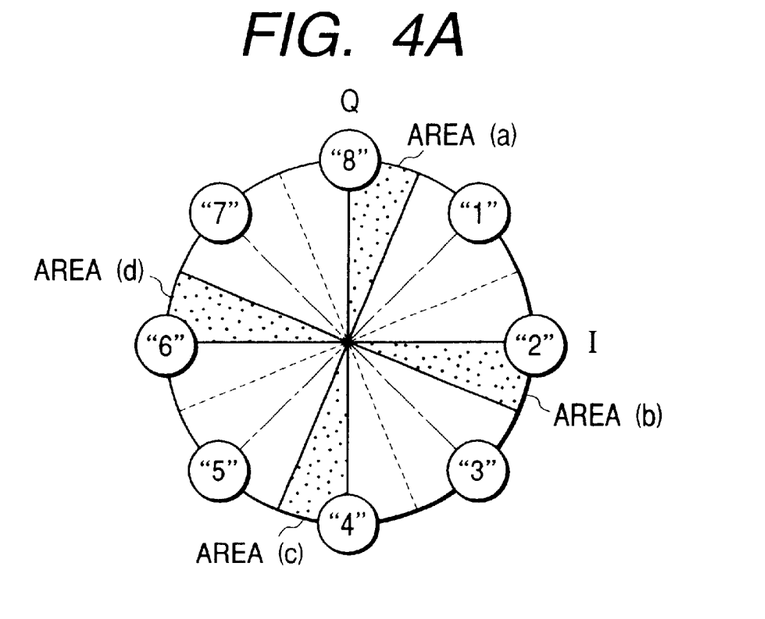
FIGS. 4A and 4B are schematic diagrams illustrating an operation of judging a signal point arrangement to be executed by the signal point arrangement dispersion value calculation circuit of the embodiment.
Figure 4B:
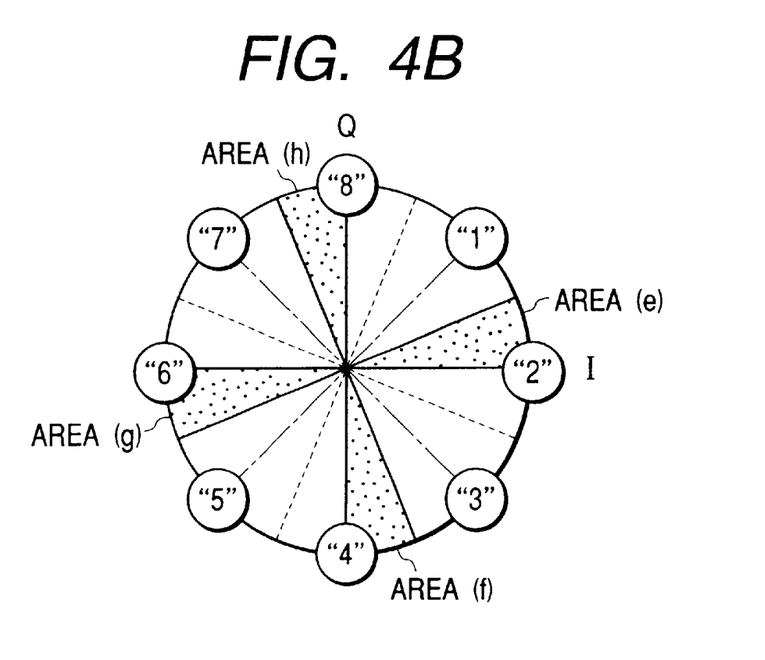
Figure 5:
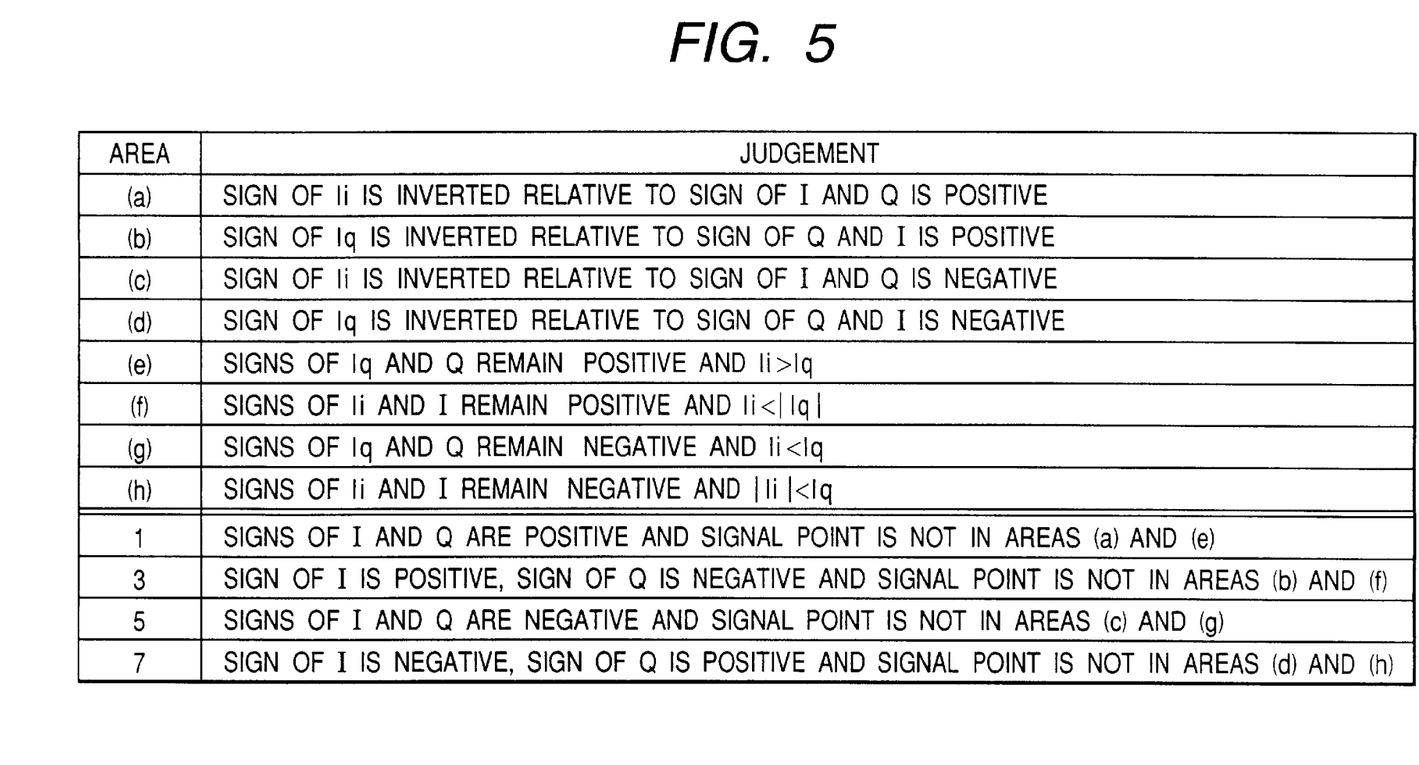
FIG. 5 is a schematic diagram illustrating an operation of judging a signal point arrangement to be executed by the signal point arrangement dispersion value calculation circuit of the embodiment.

The signal point arrangement can be judged in accordance with a change in the polarity and level of the I, Q, Ii, and Iq axes before and after the coordinate system is rotated by the 22.5° turning remapper 3 as shown in FIG. 5 from each position in the signal arrangement. The signal arrangement is divided as shown in FIGS. 4A and 4B, into 22.5° areas including area (a), area (b), area (c), area (d), area (e), area (f), area (g) and area (h), and into ranges (represented by areas in FIGS. 5 and 6) including range "1", range "3", range "5" and range "7".

If the sign of the baseband signal Ii is inverted. relative to the sign of the baseband signal I and the sign of the baseband signal Q is positive before and after the rotation by 22.5°, then the signal point arrangement is judged as the area (a). If the sign of the baseband signal Iq is inverted relative to the sign of the baseband signal Q and the sign of the baseband signal I is positive before and after the rotation by 22.5°, then the signal point arrangement is judged as the area (b). If the sign of the baseband signal Ii is inverted relative to the sign of the baseband signal I and the sign of the baseband signal Q is negative before and after the rotation by 22.5°, then the signal point arrangement is judged as the area (c). If the sign of the baseband signal Iq is inverted relative to the sign of the baseband signal Q and the sign of the baseband signal I is negative before and after the rotation by 22.5°, then the signal point arrangement is judged as the area (d).

If the signs of the baseband signals Iq and Q both remain positive and the baseband signals are Ii>Iq before and after the rotation by 22.5°, then the signal point arrangement is judged as the area (e). If the signs of the baseband signals Ii and I both remain positive and the baseband signals are Ii>|Iq| before and after the rotation by 22.5°, then the signal point arrangement is judged as the area (f). If the signs of the baseband signals Iq and Q both remain negative and the baseband signals are Ii<Iq before and after the rotation by 22.5°, then the signal point arrangement is judged as the area (g). If the signs of the baseband signals Ii and I both remain negative and the baseband signals are |Ii|<Iq before and after the rotation by 22.5°, then the signal point arrangement is judged as the area (h).

If the signs of the baseband signals I and Q are positive and the signal point is neither in the area (a) nor area (e), then the signal point arrangement is judged as the range "1". If the signs of the baseband signal I is positive and the sign of the baseband signal Q is negative and the signal point is neither in the area (b) nor area (f), then the signal point arrangement is judged as the range "3". If the signs of the baseband signals I and Q are negative and the signal point is neither in the area (c) nor area (g), then the signal point arrangement is judged as the range "5". If the signs of the baseband signal I is negative and the sign of the baseband signal Q is positive and the signal point is neither in the area (d) nor area (h), then the signal point arrangement is judged as the range "7".

Figure 6:
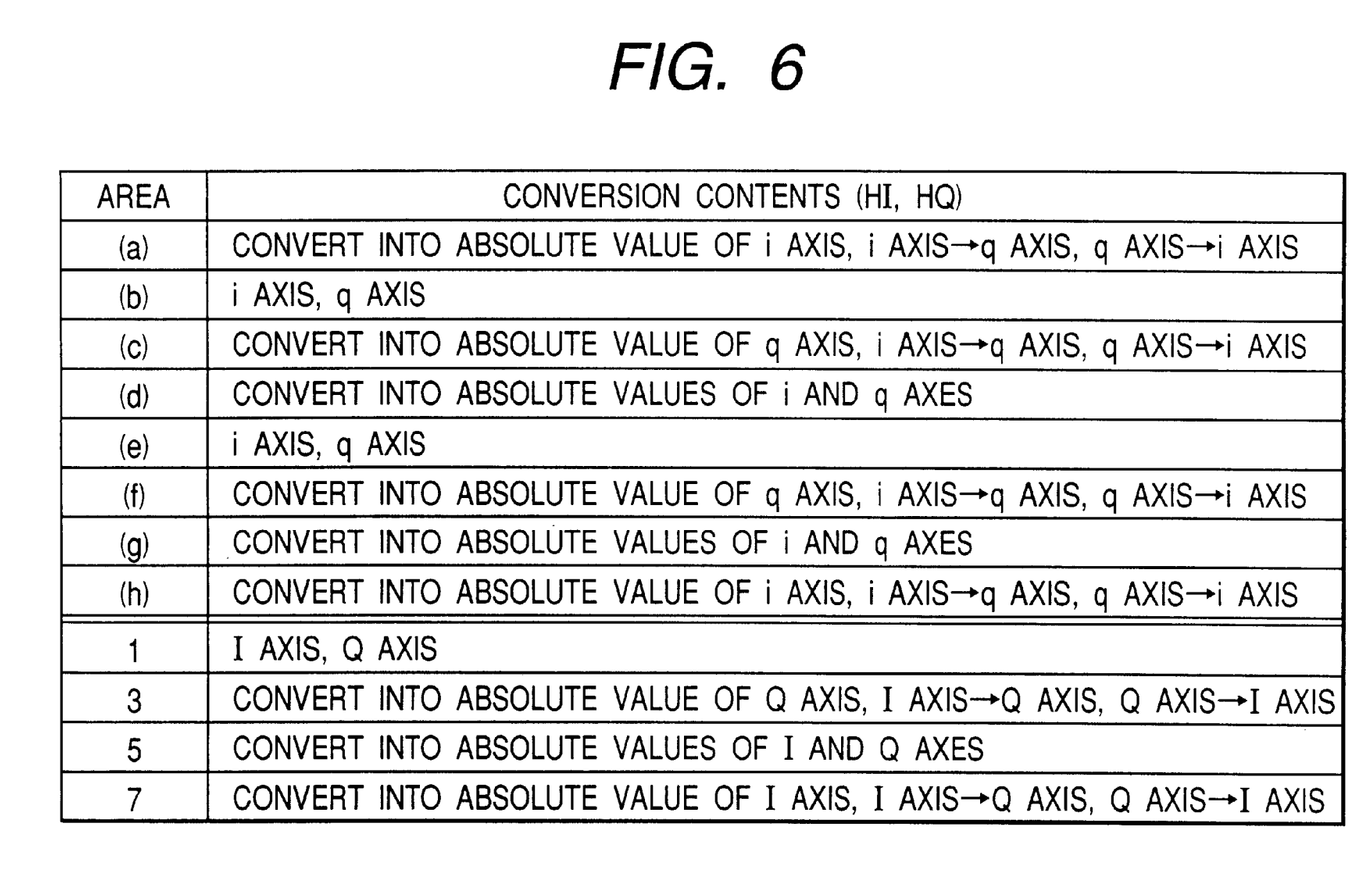
FIG. 6 is a schematic diagram illustrating an arrangement conversion operation to be executed by the signal point arrangement dispersion value calculation circuit of the embodiment in accordance with the judged signal point arrangement.

In the above manner, in accordance with inputs to the signal point arrangement conversion circuit 73, areas of the demodulated baseband signals (I ,Q) are judged as shown in FIG. 5, and in accordance with the judgement result, the signal point arrangement conversion is executed as shown in FIG. 6.

If the signal point arrangement is judged as the area (a), the baseband signal i (hereinafter described also as i axis) is converted into an absolute value thereof, the baseband signal i is replaced by the baseband signal q (hereinafter described also as q axis), and the baseband signal q is replaced by the baseband signal i, the former being output as a converted baseband signal HI and the latter being output as a converted baseband signal HQ. If the signal point arrangement is judged as the area (b), the base band signals i and q are output as converted baseband signals HI and HQ. If the signal point arrangement is judged as the area (c), the baseband signal q is converted into an absolute value thereof, the baseband signal i is replaced by the baseband signal q, and the baseband signal q is replaced by the baseband signal i, the former being output as a converted baseband signal HI and the latter being output as a converted baseband signal HQ. If the signal point arrangement is judged as the area (d), the base band signals i and q are converted into the absolute values thereof, the former being output as a converted baseband signal HI and the latter, being output as a converted baseband signal HQ.

If the signal point arrangement is judged as the area (e), the base band signals i is output as a converted baseband signal HI, and the baseband signal q is output as a converted baseband signal HQ. If the signal point arrangement is judged as the area (f), the baseband signal q is converted into an absolute value thereof, the baseband signal i is replaced by the baseband signal q, and the baseband signal q is replaced by the baseband signal i, the former being output as a converted baseband signal HI and the latter being output as a converted baseband signal HQ. If the signal point arrangement is judged as the area (g), the base band signals i and q are converted into the absolutes thereof, the former being output as a converted baseband signal HI and the latter, being output as a converted baseband signal HQ. If the signal point arrangement is judged as the area (h), the baseband signal i is converted into an absolute value thereof, the baseband signal i is replaced by the baseband signal q, and the baseband signal q is replaced by the baseband signal i, the former being output as a converted baseband signal HI and the latter being output as a converted baseband signal HQ.

If the signal point arrangement is judged as the range (1), the baseband signal i is output as a converted baseband signal HI and the baseband signal q is output as a converted baseband signal HQ. If the signal point arrangement is judged as the range (3), the baseband signal Q is converted into an absolute value thereof, the baseband signal I is replaced by the baseband signal Q, and the baseband signal Q is replaced by the baseband signal I, the former being output as a converted baseband signal HI and the latter being output as a converted baseband signal HQ. If the signal point arrangement is judged as the range (5), the base band signals I and Q are converted into the absolutes thereof, the former being output as a converted baseband signal HI and the latter being output as a converted baseband signal HQ. If the signal point arrangement is judged as the range (7), the baseband signal I is converted into the absolute value thereof, the baseband signal I is replaced by the baseband signal Q, and the baseband signal Q is replaced by the baseband signal I, the former being output as a converted baseband signal HI and the latter being output as a converted baseband signal HQ.

As apparent from the foregoing, the signal point arrangement conversion circuit 73 execute only a judgement based upon the rules shown in FIG. 5 and a conversion shown in FIG. 6 based upon the judgement. The signal point arrangement conversion circuit 73 can therefore be realized by logic circuits. The circuit scale can be made small, and the necessary area of this circuit in an integrated circuit can be made small.

DSMS can be obtained through the average value calculation and dispersion value calculation in accordance with the baseband signals (HI, HQ) output from the signal point arrangement conversion circuit 73 as described earlier.

INDUSTRIAL APPLICABILITY

As described so far, according to the signal point arrangement dispersion calculation circuit of this invention, a conversion table to be stored in a ROM for signal point arrangement conversion is not necessary for calculating signal point dispersion values. The circuit scale can be made small and the necessary area of this circuit in an integrated circuit can be made small.

What is claimed is:

1. A signal point arrangement dispersion calculation circuit, comprising:
   a phase rotation circuit for rotating a phase of a demodulated baseband signal;
   a signal point arrangement conversion circuit for judging a signal point arrangement of the demodulated baseband signal in accordance with the demodulated baseband signal and a baseband signal whose phase is rotated by said phase rotation circuit, and in accordance with the judged signal point arrangement, converting the signal point arrangement of the demodulated baseband signal into a predetermined quadrant by using the demodulated baseband signal and the baseband signal whose phase is rotated by said phase rotation circuit; and
   dispersion value calculating means for calculating a dispersion value in accordance with the baseband signal whose signal point arrangement is converted.

2. A signal point arrangement dispersion calculation circuit, comprising:
   a phase rotation circuit for rotating a phase of a demodulated baseband signal by 22.5° at a speed twice as fast as a symbol rate of the demodulated baseband signal;
   a signal point arrangement conversion circuit for judging a signal point arrangement of the demodulated baseband signal in accordance with the demodulated baseband signal and a baseband signal whose phase is rotated by said phase rotation circuit, and in accordance with the judged signal point arrangement, converting the signal point arrangement of the demodulated baseband signal into a predetermined quadrant by using the demodulated baseband signal and the baseband signal whose phase is rotated by 45° through consecutive two rotations by said phase rotation circuit; and
   dispersion value calculating means for calculating a dispersion value in accordance with the baseband signal whose signal point arrangement is converted.

* * * * *